United States Patent [19]
Grossman et al.

[11] 3,761,547
[45] Sept. 25, 1973

[54] PROCESS FOR CONTROLLING SURFACE AREA OF CERAMIC POWDERS

[75] Inventors: Leonard N. Grossman; Donald A. Brigham, both of Livermore, Calif.

[73] Assignee: General Electric Company, San Jose, Calif.

[22] Filed: July 17, 1970

[21] Appl. No.: 55,999

[52] U.S. Cl............ 264/0.5, 423/19, 423/250, 423/251, 423/252, 423/260, 423/261
[51] Int. Cl............................................ G21c 21/00
[58] Field of Search............ 23/326, 346, 352, 23/354, 355, 139, 140, 141; 252/301.1 R; 264/0.5

[56] References Cited
UNITED STATES PATENTS
| | | | |
|---|---|---|---|
| 2,881,051 | 4/1959 | Pingard | 23/143 |
| 3,333,930 | 8/1967 | Grant et al. | 23/346 |
| 2,968,537 | 1/1961 | Nixon | 23/139 X |
| 3,223,483 | 12/1965 | Osment | 23/143 |
| 3,094,384 | 6/1963 | Bertolacini et al. | 23/141 |

FOREIGN PATENTS OR APPLICATIONS
| | | | |
|---|---|---|---|
| 893,061 | 4/1962 | Great Britain | 23/355 |

Primary Examiner—Carl D. Quarforth
Assistant Examiner—R. L. Tate
Attorney—Ivor J. James, Jr., Samuel E. Turner, Sam E. Laub, Frank L. Neuhauser, Oscar B. Waddell and Joseph B. Forman

[57] ABSTRACT

Process for controlling the surface area of ceramic powder to be thermally treated comprises controlling the moisture content of the powder before the powder is thermally treated.

10 Claims, No Drawings

PROCESS FOR CONTROLLING SURFACE AREA OF CERAMIC POWDERS

BACKGROUND OF THE INVENTION

Several industrial processes involve thermal treating of ceramic powder with the final surface properties of the powder being important as the surface properties can control the use made of the ceramic. One important property of a ceramic powder is the surface area of the powder which is related to the ability of the compacted powder to be sintered to dense structures. If the ceramic powder has a high surface area per unit of weight (called an active powder), it will sinter to structures of high density after the powder is compacted in a mold. If the ceramic powder has a low surface area per unit of weight (called a dead powder), it will sinter to a porous structure of low density after the powder is compacted in a mold. For some applications it is desirable to have a ceramic powder sinter to dense structures and where this is desired the powder must have a high surface area. For other applications it is desirable to have the ceramic powder sinter to very porous structures of low density and where this is desired the powder must have a low surface area. For other applications it is desirable to prepare powders which are not capable of being sintered.

SUMMARY OF THE INVENTION

It has now been found that the surface area and activity of a ceramic powder can be controlled during thermal treatment of the powder by controlling the moisture content of the ceramic powder prior to the thermal treatment step. Where a high surface area is a desired property for a ceramic powder after it is subjected to thermal treatment, it is necessary to dehydrate the powder in an atmosphere chemically inert to the powder at the dehydrating temperature before the powder is subjected to the subsequent thermal treatment. Where a low surface area is a desired property for a ceramic powder after it is subjected to thermal treatment, it is necessary to introduce moisture uniformly in the powder before the powder is subjected to the subsequent thermal treatment.

Accordingly it is an object of this invention to achieve a controlled surface area for a ceramic powder which has been subjected to a thermal treatment.

It is another object of this invention to achieve a high surface area for a ceramic powder by removing moisture from the powder in a chemically inert atmosphere prior to thermal treatment of the powder.

It is still another object of this invention to achieve a low surface area for a ceramic powder by uniformly introducing moisture to the powder prior to thermal treatment of the powder.

Other objects and advantages of this invention will become apparent to those skilled in the art from a reading of the following specification and the appended claims.

DESCRIPTION OF THE INVENTION

It has been discovered that ceramic powders subjected to a heating process will have resulting surface activity depending on the initial moisture content of the ceramic powder before the heating process. One representative process involving thermal treatment of ceramic powders is the dehalogenation of a metallic oxyhalide composition to give a metallic oxide, e.g., heating uranium oxyfluoride in a wet hydrogen atmosphere to yield uranium dioxide useful in the nuclear industry. Another representative process is the sintering of compacted uranium dioxide structures to give sintered uranium dioxide pellets useful as a nuclear fuel. Other representative processes are the roasting of metallic sulfides to obtain metallic oxides and the calcining of calcium carbonate to obtain lime. The person skilled in the art of ceramic processing will know of other ceramic powders of various compositions subjected to thermal treatment where the final surface area of the ceramic powder determines the possible applications that can be made of the powder.

This invention presents a method of controlling the surface area of a ceramic powder after thermal processing by controlling the moisture content of the ceramic powder before it is subjected to the thermal processing. A ceramic powder of high surface area is obtained by dehydrating the moisture content of the ceramic below about $10^{16}$ molecules of moisture per square centimeter of surface area in an atmosphere chemically inert to the ceramic powder before the powder is subjected to thermal processing. The atmosphere may be chemically inert by virtue of kinetic limitations of the dehydrating process or by chemical compatibility of the atmosphere with the powder. A ceramic powder of low surface area is obtained by uniformly mixing moisture in the ceramic powder before the powder is subjected to thermal processing.

The ceramic powders capable of being treated in the practice of this invention include representative ceramics such as titanium dioxide ($TiO_2$), aluminum oxide ($Al_2O_3$), silicon dioxide ($SiO_2$), the uranium oxides including uranium dioxide ($UO_2$), uranium trioxide ($UO_3$), uranium tritaoctoxide ($U_3O_8$), uranium sesquioxide ($U_2O_3$), uranium pentoxide ($U_2O_5$), and uranium tetroxide ($UO_4$), the plutonium oxides including plutonium dioxide ($PuO_2$), gadolinium oxide ($Gd_2O_3$), $Li_2O$, $Na_2O$, $K_2O$, $Rb_2O$, $Cs_2O$, $BeO$, $MgO$, $B_2O_3$, $CaO$, $SrO$, $BaO$, $Sc_2O_3$, $Y_2O_3$, $La_2O_3$, $ZrO_2$, $HfO_2$, the vanadium oxides, the niobium oxides, the tantalum oxides, the chromium oxides, the molybdenum oxides, the tungsten oxides, the lanthanide oxides, the actinide oxides; the solid oxyhalides, oxycarbides, oxynitrides, silicides and mixtures of the foregoing ceramic compounds.

The temperature employed in the dehydration process can vary over a wide range, but temperatures are employed which do not catalyze reaction between the ceramic and the atmosphere being maintained over the ceramic or do not cause phase changes in the ceramic. A person skilled in the art will realize that the temperature utilized in the dehydration step will vary with the particular ceramic being treated and the particular atmosphere being maintained over the ceramic. In practice the dehydration temperature is generally maintained in the range of about 100° to 400°C. In one particular application, uranium oxide ceramics have been dehydrated at a temperature in the range of about 100° to about 400°C. The higher the temperature being employed in the foregoing range and the lower the moisture content maintained in the atmosphere during dehydration, the greater is the rate of dehydration of the ceramic powder.

The gaseous atmosphere maintained over the ceramic being dehydrated can include pure atmospheres non-reactive with the ceramic being treated or mixtures of gases non-reactive with the ceramic being treated. Representative of the gases capable of being maintained over the ceramic by virtue of their chemical inertness with the ceramic powder are the inert gases including helium, neon, argon, krypton, xenon and mixtures thereof. Other representative non-reactive gases which can be employed in the practice of dehydrating ceramics include nitrogen, dry hydrogen, dissociated ammonia and mixtures of the foregoing. Air or other nominally reactive gases may be used if the dehydration temperatures employed are below the temperatures where other reactions of the gas with the ceramic proceed at appreciable rates.

Any suitable means can be employed to introduce moisture to the ceramic powder where a dead powder is desired and it is preferred to mix the ceramic during addition of the moisture. Representative methods of adding moisture include sprinkling water into a bed of ceramic powder which is being uniformly agitated by stirring means, passing a water-laden gas (e.g., 100 percent humidity air) over the powder preferably with agitation of the powder and immersion of the powder into water.

Those skilled in the art will gain a further understanding of this invention from the following illustrative, but not limiting, examples of the invention.

EXAMPLE 1

5.8 grams of uranyl fluoride ($UO_2F_2$) having a surface area between 20 and 22 square meters per gram and a water content of 8 weight percent were treated according to the practice of this invention before being subjected to a defluorination process in moist hydrogen (0.2 volume percent water) at 725°C. The powder was dehydrated in dry hydrogen at 150°C for one half an hour. The powder was then defluorinated in moist hydrogen at 725°C giving a uranium dioxide with 3.1 square meters per gram which was compacted at 20,000 pounds per square inch and sintered to 91.6 percent of theoretical density using a sintering temperature of 1,650°C in wet hydrogen (about 2.0 volume percent water).

EXAMPLE 2

About 5 grams of uranyl fluoride from the same batch as in Example 1 are defluorinated in moist hydrogen (0.2 volume percent water) at 725°C at a rapid rate of heating to temperature without initial dehydration giving uranium dioxide powder having a surface area of 0.5 square meters per gram which sintered to 65 percent of theoretical density using the same sintering process described in Example 1.

EXAMPLE 3

15 grams of the same batch of uranyl fluoride used in Example 1 were dehydrated as described in Example 1 and then exposed to moist air of 100 percent relative humidity for about 70 hours at room temperature. Defluorination of the powder followed by compaction and sintering of the powder was performed as described in Example 2. The resulting pellet has a density of 71 percent of theoretical density.

As will be apparent to those skilled in the art, various modifications and changes may be made in the invention described herein. It is accordingly the intention that the invention be construed in the broadest manner within the spirit and scope as set forth in the accompanying claims.

We claim:

1. A process for maintaining surface area of a ceramic powder during a heat treatment in excess of about 400°C where the ceramic powder has a moisture content in excess of about $10^{16}$ molecules per square centimeter, the process comprising the steps of
   a. heating the ceramic powder at a temperature in the range of about 100° to about 400°C so that the moisture content of the ceramic powder is reduced to below about $10^{16}$ molecules per square centimeter of surface area, and
   b. thereafter conducting the heat treatment on the ceramic powder at a temperature in excess of about 400°C.

2. A process according to claim 1 in which the heating step is conducted under an atmosphere chemically inert to the ceramic powder.

3. A process according to claim 1 in which the atmosphere is comprised of a gas selected from the group consisting of helium, neon, argon, krypton, xenon, nitrogen, dry hydrogen, dissociated ammonia and mixtures thereof.

4. A process according to claim 1 in which the ceramic powder is comprised of uranium oxide.

5. The process according to claim 1 in which the ceramic powder is comprised of uranium dioxide.

6. A process according to claim 1 in which the ceramic powder is comprised of uranyl fluoride.

7. A process for deadening a ceramic powder during a heat treatment in excess of about 400°C where the ceramic powder has a moisture content of less than about $10^{16}$ molecules per square centimeter, the process comprising the steps of
   a. uniformly introducing moisture to the ceramic powder so that the moisture content of the powder is in excess of about $10^{16}$ molecules per square centimeter, and
   b. thereafter conducting the heat treatment on the ceramic powder at a temperature in excess of about 400°C.

8. A process according to claim 7 in which the ceramic powder is comprised of uranium oxide.

9. A process according to claim 7 in which the ceramic powder is comprised of uranium dioxide.

10. A process according to claim 7 in which the ceramic powder is comprised of uranyl fluoride.

* * * * *